United States Patent [19]

Furzer

[11] 4,381,974

[45] May 3, 1983

[54] DISTILLATION COLUMNS

[76] Inventor: Ian A. Furzer, Department of Chemical Engineering, University of Sydney, Parramatta Rd., New South Wales 2006, Australia

[21] Appl. No.: 299,986

[22] Filed: Sep. 8, 1981

[51] Int. Cl.$^3$ .......................... B01D 3/22; B01D 3/24
[52] U.S. Cl. .............................. 202/158; 261/114 R; 261/114 TC; 261/DIG. 11
[58] Field of Search ............... 202/158, 153, 154, 156, 202/162, 267 R, 267 A; 55/444, 464; 261/114 R, 114 TC, DIG. 11; 196/98–100, 115, 125, 133, 155

[56] References Cited

U.S. PATENT DOCUMENTS

| | | | |
|---|---|---|---|
| 801,211 | 10/1905 | Butzow | 55/444 |
| 1,770,725 | 7/1930 | Bartels | 216/114 R |
| 3,700,216 | 10/1972 | Uitti et al. | 261/114 R |

OTHER PUBLICATIONS

Periodic Cycling of Plate Columns: Discrete Residence Time Distribution by I. A. Furzer et al., AIChE Journal (vol. 22, No. 6) Nov., 1976, pp. 1118–1125.
Periodic Cycling of Plate Columns by G. J. Duffy et al., Chemical Engineering Science, vol. 33, pp. 897–904.
Periodic Cycling of Plate Columns by E. B. Dale et al., Chemical Engineering Science, vol. 33, pp. 905–911.
Microprocessor System for Plate Column Control by I. A. Furzer et al., IEEE Transactions on Industrial Electronics & Control Instrumentation, vol. IECI-25, No. 2, May 1978.
Mass Transfer on a Single Sieve Plate Column Operated with Periodic Cycling by G. J. Duffy et al., AIChE Journal (vol. 24, No. 4), Jul., 1978, pp. 588–598.
The Discrete Residence Time Distribution of a Distillation Column Operated with Microprocessor Controlled Periodic Cycling by I. A. Furzer, The Canadian Journal of Chemical Engineering, vol. 56, Dec., 1978, pp. 747–750.

Primary Examiner—Frank Sever
Attorney, Agent, or Firm—Ostrolenk, Faber, Gerb & Soffen

[57] ABSTRACT

A plate column filled with downcomerless plates comprises receptacle means between each adjacent pair of upper and lower plates to delay liquid flowing downwards from the upper to lower plate, without interfering in the upward flow of vapor. A number of alternative receptacle means are provided, including laterally spaced staggered channels, perforate wells, and a helical channel.

9 Claims, 7 Drawing Figures

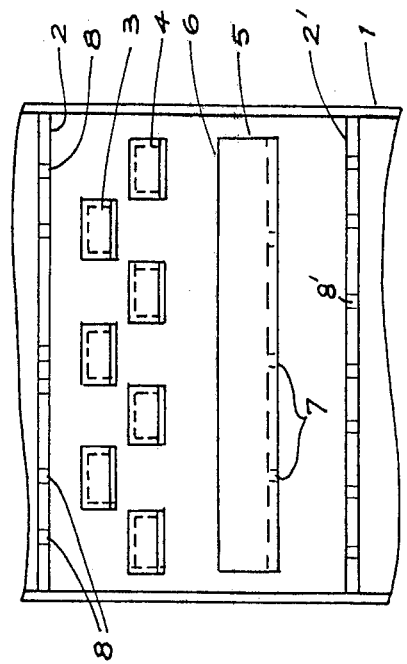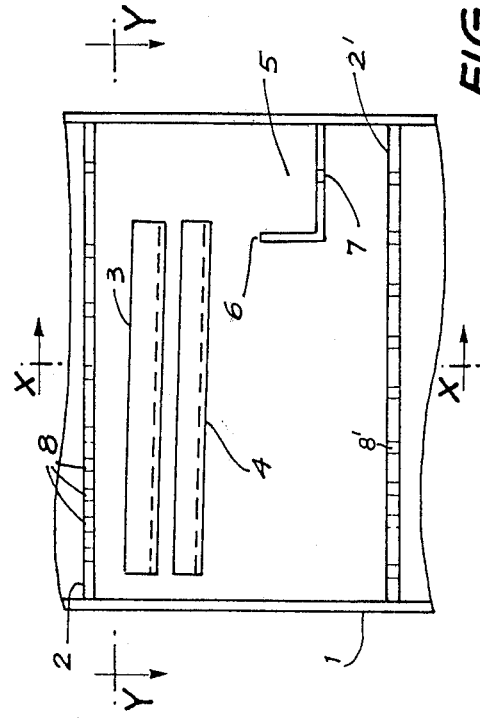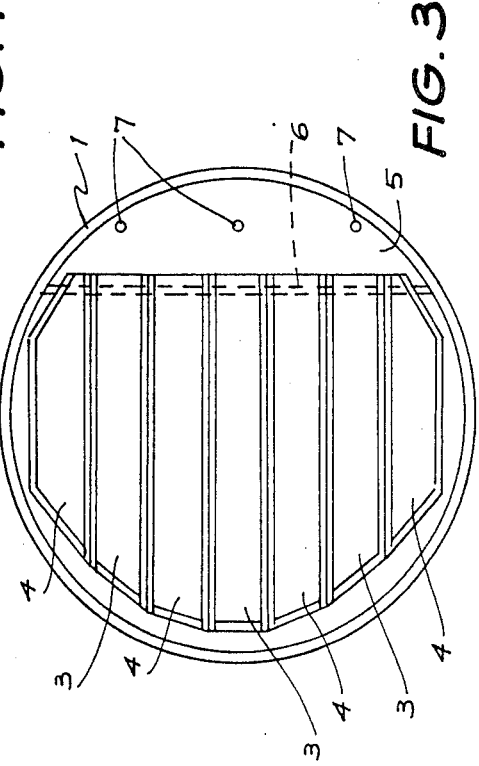

DISTILLATION COLUMNS

FIELD OF THE INVENTION

This invention relates to an improved form of internal construction for plate columns and to methods of operating such columns. In particular the invention relates to the operation of plate columns by the periodic cycling technique and to a novel form of construction designed to improve the efficiency of such operations. Although the invention is described with particular reference to distillation columns it is to be understood that the invention is applicable to other operations conducted in such columns, such as gas absorption and gas stripping. Such operations are usually referred to collectively as mass-transfer operations.

PRIOR ART

Periodic cycling is a technique which can be applied to all separative processes taking place in plate columns and involves the use of an on-off control action in the vapour flow to the column. During the brief times when the vapour flow is zero, liquid drains from plate to plate. The technique is particularly applicable to downcomerless plates because columns fitted with downcomers and weirs have unstable pressure dynamic characteristics due to changes in liquid hold-up on the plates and in the downcomers.

The theory of this unsteady state processing predicts a major increase in separating ability compared with the conventional steady state processing, and was reported initially by Cannon et al, for example in *Ind. Eng. Chem.* 53, No. 8 (1961) at pages 629, 630 and 632. The theory states that because of the larger mass transfer forces available during the unsteady state processing, only 50% of the number of plates required for steady state operation should be required in the unsteady state operation. This would of course lead to great advantages not only in the increased efficiency of separation, but also in the capital expenditure on columns of reduced height.

In practice however, although such improvements have been observed in small columns, it has not been possible in large columns to obtain the theoretical increases predicted by the theory. It has been suggested that the reason is the mixing of the liquid as it drains from plate to plate when the vapour flow rate is zero; thus it has been observed liquid draining from a plate tends to by-pass the plate immediately below and penetrates the second plate below, which has a significant effect on the separating ability of the column.

SUMMARY OF THE INVENTION

According to one aspect of the present invention there is provided a plate column fitted with downcomerless plates which column comprises:
- at least one pair of adjacent downcomerless plates comprising an upper plate and a lower plate;
- delay means for introducing a time delay into the time taken for liquid in said column to flow from the upper plate to the lower plate;
- said delay means comprising receptacle means for receiving said liquid after the liquid has flowed downward from the upper plate, the receptacle means collecting said liquid and delivering the liquid with a time delay onto the lower plate;
- said delay means being so arranged within the column that gaseous matter rising up the column does not pass through said liquid collected in the receptacle means whereby said delay means does not substantially hinder the passage of gaseous matter up the column from said lower plate to said upper plate.

The receptacle means may be provided with one or more drain holes. Thus, in its simplest form the delaying means is a receptacle provided with drain holes.

In a preferred form, the receptacle means comprises two rows of substantially level channels extending across the column, the channels being spaced from one another and arranged in such manner that the channels of the upper row are located above the spaces separating the channels of the lower row, so that liquid draining from said upper plate is caught in one or other of the rows of channels.

The time delay arises as a result of the time taken by the liquid to flow along the channels, which are in general horizontal or only slightly inclined.

Alternatively, the receptacle means may comprise a row of horizontally spaced channels extending across the column, and a row of horizontally spaced deflector plates disposed above spaces between the channels such that liquid falling from said upper plate falls either directly into a channel or is deflected into a channel.

Advantageously, the column further comprises a well provided with a weir or other level control arrangement, and one or more drain holes; one end of each channel being closed and the other end being open and disposed above the well so that liquid flows from the channel into the well.

In a further embodiment, the delaying means comprises a helical chute arrangement adapted to divert and delay liquid flowing from the upper to the lower plate.

A second aspect of the invention provides a method of operating a plate column fitted with downcomerless plates, which comprises introducing a time delay into the flow of liquid from an upper to a lower plate of a pair of adjacent plates.

Typically, the delaying means would delay the liquid flow for 1–2 seconds and deliver all the delayed liquid in the following 5–10 seconds. However, the precise times will be chosen according to operating conditions.

The purpose of the delaying means is to prevent, as far as practicable, any liquid draining from one plate from reaching the next lower plate during the period of zero flow of gaseous matter hereinafter referred to as the LDP (Liquid drain period). Thus the delaying means can be designed to provide a delay period equal to a desired LDP; alternatively and more easily, the LDP, that is the period during which the gaseous flow is cut off, can be adjusted to coincide with the natural period required for the liquid to drain from one plate through the delaying means to the plate below; as the gaseous matter cut-off period is not critical, this presents no practical problems.

The time delay of liquid fluid elements in passing through the time delay system can be obtained from a solution of the unsteady state equations of mass and energy that govern the system. The law of conservation of mass provides equations for the mass of liquid on (i) the sieve plate, (ii) the channels and (iii) in the weir head. The law of conservation of energy expressed as Bernoulli's equation can also be written for parts (i) to (iii). The numerical solution of the simplified set of unsteady state equations provides the time delays of fluid elements in passing through this system. The solution is characterized by a pure time delay followed by a distribution of time delays which approaches zero at long time delays. For plug flow of the liquid, the liquid drain period (LDP) should be less than or equal to the pure time delay.

For longer values of LDP some liquid can bypass the plate immediately below. Let the fraction (a) of the liquid mass on a sieve plate reach the plate immediately below and let (b) be the fraction that passes through the plate immediately below. It can be shown theoretically that the optimum values of the parameters (a) and (b) are a=1.000 and b=0.000. Under these conditions the LDP is less than or equal to the pure time delay. In the general case values of (a) and (b) can be used to predict the distribution of time delays. The theory of the discrete residence time distribution (DRTD) has been originally presented by the inventor in the A.I.Ch.E. Journal 1118, (6), 22, (1976). These DRTD curves have been experimentally measured for multiple plate columns by injecting a tracer, such as sodium chloride and monotoring its concentration on the lower plates on successive cycles. Values of the DRTD curves and optimum values of the parameter (a) and (b) to fit these curves have been presented by the author for a distillation column in, The Canadian Journal of Chemical Engineering, 747, 56, (1978).

The discrete residence time distribution curves provide a rapid method of obtaining the time delays of fluid elements and assessing the correct value of the LDP for plug flow liquid operation.

The delaying means may take a number of forms; however, it is necessary as far as possible to delay the drainage of as much as possible of the draining liquid without interfering with the passage of gaseous matter up the column.

BRIEF DESCRIPTION OF THE DRAWINGS

Embodiments of the invention will now be described with reference to the drawings, wherein:

FIG. 1 is a schematic cross-section of a column according to the invention,

FIG. 2 is a vertical section of the column along the line X—X in FIG. 1.

FIG. 3 is a plan view of the column along the line Y—Y in FIG. 1.

DETAILED DESCRIPTION OF PREFERRED EMBODIMENTS

Figure 5:
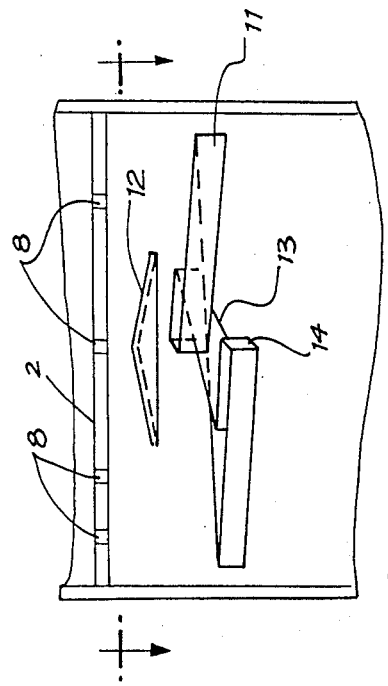
FIG. 5 is a schematic elevation of a third embodiment of the invention.

According to one embodiment illustrated in FIGS. 1 to 3, the delaying means comprise two rows of substantially level channels 3, 4 open at one end and extending across the column, the channels 3, 4 being spaced from one another and arranged in such manner that the channels 3 of one row are located above the spaces separating the channels 4 of the other row, so that liquid draining from a plate is caught in one or other of the channels. Below the open ends of the channels 3, 4 there are provided well means arranged in such manner that liquid flowing from the channels 3, 4 must flow into the well before passing to the plate below. The well means are provided with a weir or other level control arrangement, and also with one or more drain holes in the base. Operation of this embodiment is described with particular reference to FIGS. 1 to 3.

In FIG. 1 there is shown schematically a vertical cross-section of a portion of column according to the invention. Within the column 1 there is provided a series of downcomerless sieve plates 2 provided with holes 8. Extending across the column 1, there are provided two rows of channels 3 and 4, each channel 3, 4 being closed at one end and open at the other. Well 5 is located below the open ends of channels 3 and 4 and forms a weir 6 and is provided with drain holes 7.

In operation, during the vapour flow period (VFP) vapour passing up the column passes through the sieve holes 8 and maintains a liquid level on the sieve plate 2. During the liquid drain period (LDP) the vapour flow is cut off and liquid immediately drains through holes 8 into channels 3 and 4, a small quantity of the liquid passing into well 5 during the initial fraction of the LDP. The mass of liquid then flows rapidly into the well 5, overflowing over weir 6 onto the plate 2′ below; this overflowing onto the lower plate 2′ commences at the beginning of the next VFP so that effectively substantially no liquid from plate 2′ reaches the next lower plate during the LDP; the few drops which pass through drain holes 7 have no significant effect on the operation. During the VFP, liquid remaining in well 5 drains through holes 7 onto the plate 2′ below.

It will be appreciated that the durations of the LDP and VFP are not critical although in general, depending upon the size of the column, typical durations would be between 1 and 2 seconds for the LDP and between 15 and 20 seconds for the VFP. It is, of course, important to match the LDP or vapour cut-off period with the delay of the liquid in channels 3 and 4 before it pours out and over weir 6 onto the lower plate.

Channels 3 and 4 are preferably level but they may be provided with a very slight inclination towards their open ends; too great an inclination would of course reduce the delay period to less than that of the LDP.

It will also be appreciated that the spacing of the channels permits unimpeded flow of vapour up the column during the VFP but temporarily traps all liquid flowing downwards during the LDP so that substantially no liquid falls directly from one plate to another, and more particularly no liquid flows from one plate directly through the next lower plate during the LDP.

This arrangement provides substantially the theoretically ideal "plug" flow of liquid from plate to plate during the LDP with no by-passing of plates by the liquid.

Figure 4:
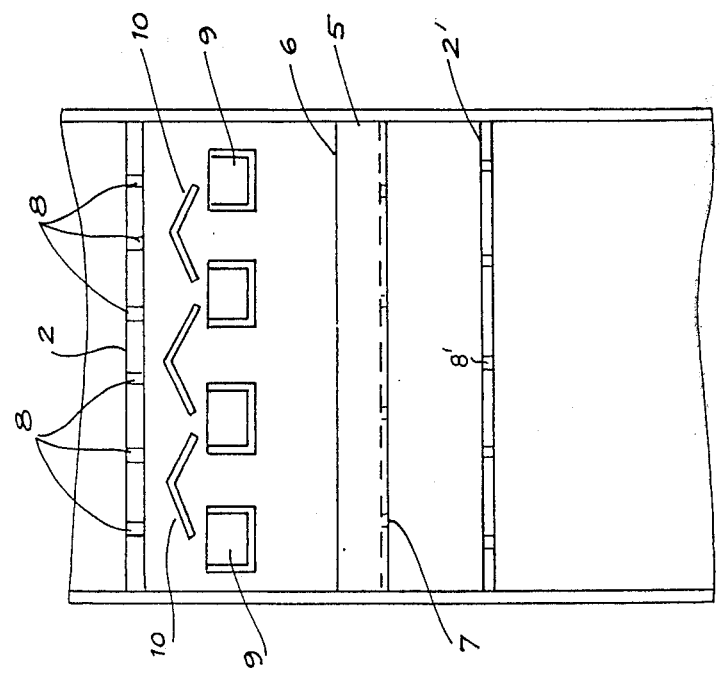
FIG. 4 is a schematic cross-section of a second embodiment of the invention.

Alternative delaying arrangements are of course possible, and two such possibilities are illustrated in FIGS. 4 and 5.

In FIG. 4 there is shown in end elevation a single row of spaced channels 9 over which spaced "hat" arrangements 10 are provided. The "hats" 10 are located over the spaces between channels 9 in such manner that liquid flowing from a plate above is either caught directly in channels 9, or impinges first on hats 10 before being diverted into channels 9. A well 5 having a weir 6 and drain holes 7 is provided as in the embodiment shown in FIG. 1. The well ensures that no liquid falls directly from the upper to the lower plate, but since its volume is relatively small in comparison to that of the channels it introduces only an insignificant extra time delay.

Figure 6:
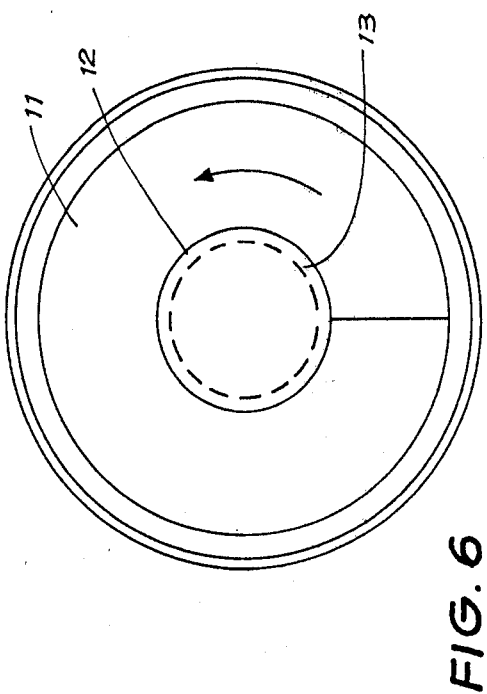
FIG. 6 is a view from above of the helical shute of FIG. 5.

In FIGS. 5 and 6 there is shown a helical chute arrangement 11 whereby all liquid draining from a plate 2 above is diverted into an open end of the chute 11, either directly or after impinging on baffle device 12 which covers a central opening 13 through which vapour can pass upwardly through the spaces between plates 2, 2'. The liquid flows downwardly onto the plate 2' (not shown in FIG. 5) below through chute exit 14. Again the delay period for the liquid flowing down the chute 11 corresponds with the LDP or vapour cut-off period.

This embodiment is again used in conjunction with a well 5 of the type shown in FIG. 1. Alternatively, a second helical chute (not shown) of opposite pitch may be arranged below the helical chute 11 shown, so that liquid flowing from the first chute onto the second chute is caused to change its direction of flow and is thereby delayed somewhat.

Figure 7:
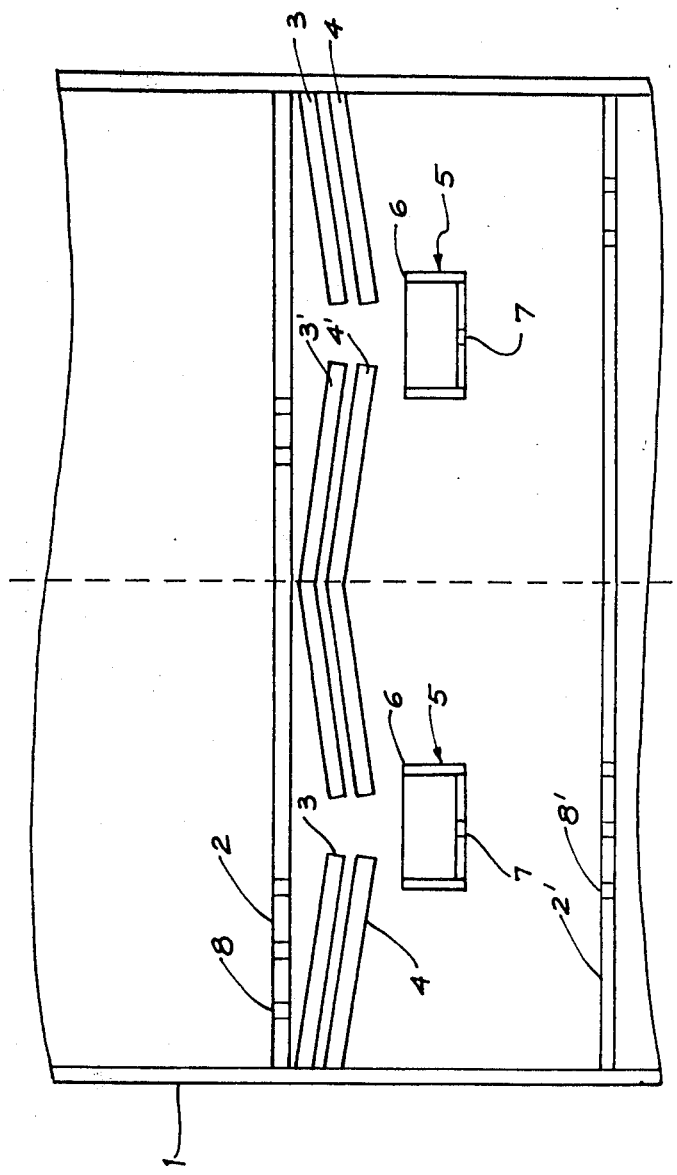
FIG. 7 is a schematic cross-section of an embodiment useful for a wide column.

FIG. 7 shows an embodiment of the invention which is particularly useful for wide columns, for example columns of diameter greater than 1 meter. In such columns, a one-way flow arrangement such as in FIGS. 1 to 3 may produce a too lengthy time delay. The delay may be reduced by employing a two-way flow by means of channels 3' and 4' which are constructed so as to rise to a central "watershed". Otherwise, the construction is analogous to the embodiment shown in FIG. 1.

The invention accordingly provides an improved form of column internal structure adapted to provide a performance approaching the theoretical ideal for periodic cycling operation.

In addition, the invention embraces methods for operating columns of the type described, including methods of distillation, gas stripping, gas absorption and the like. The invention is applicable to mass transfer operations in general, wherein a liquid flows down a column and gaseous matter flows up. The term "gaseous matter" encompasses both gases (as in stripping and absorption operations) and vapours (as in distillation).

I claim:

1. A distillation column fitted with downcomerless plates, said column comprising:
   at least one pair of adjacent downcomerless plates defining an upper plate and a lower plate, each said plate extending over the entire width of said column and including a plurality of drain holes through which gas can normally flow up said column and through which liquid can flow down said column during said periodic interruption of said gas flow;
   delay means for introducing a time delay into the time taken for liquid in said column to flow from said upper plate to said lower plate;
   said delay means comprising receptacle means for receiving substantially all of said liquid passing through said drain holes in said upper plate after said liquid has flowed downward through said drain holes in said upper plate, said receptacle means collecting said liquid and delivering said liquid with a time delay onto said lower plate;
   said delay means being arranged within said column in such a manner that gaseous matter rising up said column does not pass through said liquid collected in said receptacle means and whereby said delay means does not substantially hinder the passage of gaseous matter up said column from said lower plate to said upper plate; and means for causing gases to periodically flow up said column so as to carry out a periodic cycling mass transfer operation.

2. A column according to claim 1 wherein said receptacle means comprises at least one open-ended channel.

3. A column according to claim 2, wherein said receptacle means comprises an upper and a lower row of substantially level channels extending across said column, said channels being spaced from one another and arranged in such manner that said channels of said upper row are located above spaces separating said channels of said lower row, so that liquid draining from said upper plate is caught in either one of said rows of channels.

4. A column according to either one of claims 3 and 2, in which said receptacle means further comprises a well provided with a weir level control arrangement, and at least one drain hole, one end of each said channel being closed and the other end being open and disposed above said well so that liquid flows from each of said channels into said well, and then drains from said well through said at least one drain hole formed in said well.

5. A column according to claim 2, wherein said receptacle means comprises:
   a row of horizontally spaced channels extending across said column; and
   a row of horizontally spaced deflector plates disposed above spaces between said channels such that liquid from said upper plate falls either directly into one of said channels or is deflected into one of said channels.

6. A column according to claim 1 wherein said receptacle means comprises a well having one or more drain holes formed therein.

7. A column according to claim 1, wherein said delay means comprises a helical chute arrangement adapted to divert and delay liquid flowing from said upper to said lower plate.

8. A combination including the column of claim 1, (and means for causing gases to periodically flow up said column so as to carry out a periodic cycling mass transfer operation).

9. A distillation column fitted with downcomerless plates, said column comprising:
   (A) at least one pair of adjacent downcomerless plates comprising an upper plate and a lower plate, each said plate extending over the entire width of said column and including a plurality of drain holes through which gas can normally flow up said column and through which liquid can flow down said column during said periodic interruption of said gas flow;
   (B) delay means for introducing a time delay into the time taken for liquid in said column to flow from said upper plate to said lower plate, said delay means comprising:
   (1) two rows of substantially level channels extending across said column, said channels being spaced from one another and arranged in such manner that said channels of said upper row are located above said spaces separating said channels of the lower row, so that substantially all of said liquid draining through said drain holes in said upper plate is caught in said rows of channels; and
   (2) a well provided with a weir level control arrangement, and at least one drain hole, one end of each said channel being closed and the other end being open and disposed above said well so that liquid flows from each said channel into said well, and then drains from said well through said at least one drain hole in said well;

said delay means being arranged within the column in such a manner that gaseous matter rising up said column does not pass through said liquid collected in either said channels or said well whereby said delay means does not substantially hinder the passage of gaseous matter up said column from said lower plate to said upper plate; and means for causing gases to periodically flow up said column so as to carry out a periodic cycling mass transfer operation.

* * * * *